G. W. GANE.
SEED AND FERTILIZER SOWER.
APPLICATION FILED AUG. 13, 1914.

1,167,814.

Patented Jan. 11, 1916.

WITNESSES
Alfred R. Anderson
Cornelius Voving

INVENTOR
G. W. GANE
By Ivan Dedennel
ATTORNEY

UNITED STATES PATENT OFFICE.

GEORGE WILLIAM GANE, OF NORMANBY, TARANAKI, NEW ZEALAND.

SEED AND FERTILIZER SOWER.

1,167,814.   Specification of Letters Patent.   Patented Jan. 11, 1916.

Application filed August 13, 1914. Serial No. 856,557.

*To all whom it may concern:*

Be it known that I, GEORGE WILLIAM GANE, subject of the King of Great Britain, residing at Normanby, Taranaki, in the Dominion of New Zealand, have invented new and useful Improvements in Seed and Fertilizer Sowers; and I do hereby declare the following to be a full, clear, and exact description of the same.

This invention relates to improvements in apparatus designed for the sowing of seed and fertilizers and is applicable to all classes of machines employed for that purpose in which the seed and fertilizer are delivered from a hopper containing them through outlet tubes in the bottom of such hopper.

The invention has been devised principally in order to provide improvements in construction that will allow of the even feeding of the material through the several outlets and for the amount of material thus fed being regulated with readiness and exactitude.

In fully describing the invention reference will be made to the accompanying sheet of drawings, in which:—

Figure 1:
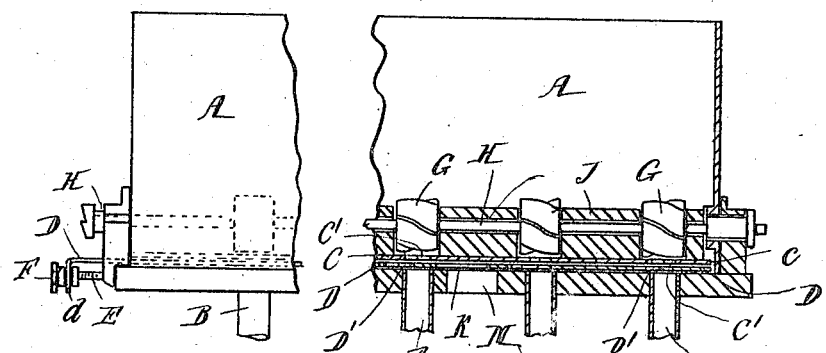
Figure 2:
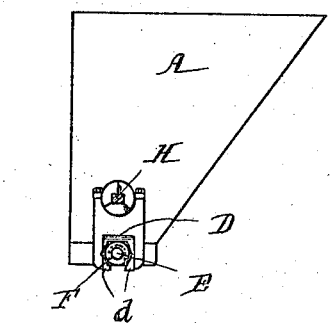
Figure 3:
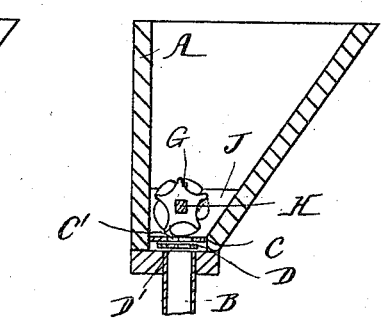
Figure 4:
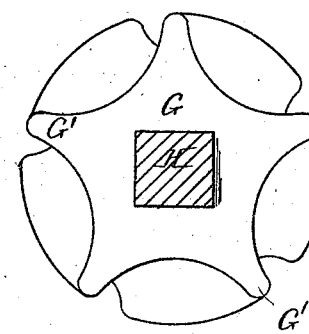
Figure 5:
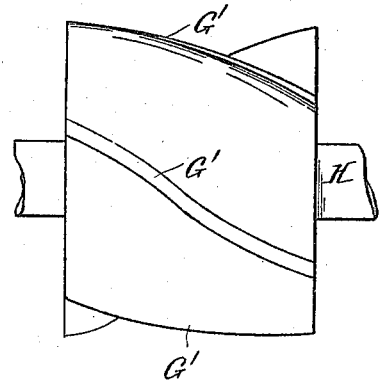

Figure 1 is a part front elevation and part sectional elevation of a seed or fertilizer box or hopper fitted with the improved feeding apparatus. Fig. 2 is an end elevation, and Fig. 3 a cross sectional elevation of the same. Figs. 4 and 5 are end and front elevation respectively of one of the feed rollers employed with the apparatus, shown on an enlarged scale.

A represents an ordinary seed box or hopper having discharge openings B arranged at intervals along its bottom. In this invention a plate C is arranged along the bottom of the box and is formed with apertures C' therein coinciding in position with the openings B. A second plate D is placed between the bottom of the box and the plate C and this plate is mounted so that it may move to and fro longitudinally. It is also formed with a number of apertures D' that correspond in number, shape and size with the apertures C' of the plate C. By moving this plate D in either direction its apertures may be made to coincide fully with the apertures C' or be partially or wholly shut off therefrom. The passages from the box to the discharge openings may thus be regulated in size at will.

The apertures C' and D' are preferably made of lozenge or diamond shape in order to more effectually regulate the extent of their opening.

The plate D at one end is carried out through the end of the box A and is turned down and forked as shown at d (Figs. 1 and 2). A screw pin E projecting from the end of the box passes between the fork members and a collar nut F is screwed upon this pin and engages the forks so that by screwing it in or out, the plate D may be correspondingly moved. Thus the plate may be fixed at any position desired.

Mounted within the box, one above each aperture C', are the helically ribbed rollers G. These rollers are mounted on a spindle H extending throughout the full length of the box and to which rotation is adapted to be imparted by gearing with the machine in any of the well known ways. The rollers are so positioned as to drag closely across the surface of the plate in their rotation and thereby for each one to carry around a supply of the material in the box and feed it across the aperture C' beneath. The rollers therefore serve to feed constant and regular quantities of the material through the discharge openings. The area of the box between the rollers is preferably filled in by blocks J (Figs. 1 and 3) extending up to near the top level of the rollers in order to prevent any liability of the rollers choking with the material. In this case the material gravitates on to the top edges of the rollers and is carried around by them and delivered from their undersides over the apertures C'.

Provision is made for the escape of any material that may be caught in between the plates C and D by forming slot apertures, such as K (Fig. 1) in the plate D which slot apertures pass over slots M in the bottom of the box and allow of any such material falling through. Only one of each of these apertures is shown in the drawings, but they may be arranged between each two discharge openings.

The form of roller G employed is shown in detail in Figs. 4 and 5 and is made with any desired number of ribs G' extending in parallel helical lines across its peripheral width so as thereby to leave hollows between, into which the seed or fertilizer will fall.

What I do claim as my invention and desire to secure by Letters Patent is:—

In seed and fertilizer sowers, the combination of a box having a number of discharge openings and slot apertures in the bottom thereof; a plate fixed above said bottom and provided with apertures registering with the discharge openings; and a sliding plate having therein discharge apertures corresponding to said discharge openings and slot apertures corresponding to the slot apertures.

In testimony whereof, I have signed this specification in the presence of two subscribing witnesses.

GEORGE WILLIAM GANE.

Witnesses:
W. ALEXANDER.
M. E. BROWN.